(12) United States Patent
Crabb et al.

(10) Patent No.: US 11,136,443 B2
(45) Date of Patent: Oct. 5, 2021

(54) THERMOPLASTIC COMPOSITE

(71) Applicants:Arkema France, Colombes (FR); Charles C. Crabb, Royersford, PA (US)

(72) Inventors: Charles C. Crabb, Royersford, PA (US); Jack Reed, Milton, DE (US); Florence Mehlmann, Berwyn, PA (US); Adam N. Toft, Norristown, PA (US); Amy A. Lefebvre, Pottstown, PA (US)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 14/770,899

(22) PCT Filed: Mar. 14, 2014

(86) PCT No.: PCT/US2014/027379
§ 371 (c)(1),
(2) Date: Aug. 27, 2015

(87) PCT Pub. No.: WO2014/152473
PCT Pub. Date: Sep. 25, 2014

(65) Prior Publication Data
US 2016/0009910 A1    Jan. 14, 2016

Related U.S. Application Data

(60) Provisional application No. 61/786,752, filed on Mar. 15, 2013, provisional application No. 61/901,556, filed on Nov. 8, 2013.

(51) Int. Cl.
*B32B 7/02*      (2019.01)
*C08J 7/05*     (2020.01)
(Continued)

(52) U.S. Cl.
CPC .................. *C08J 7/05* (2020.01); *B32B 7/12* (2013.01); *B32B 27/08* (2013.01); *B32B 27/302* (2013.01);
(Continued)

(58) Field of Classification Search
CPC ......... B32B 7/12; B32B 27/08; B32B 27/302; B32B 27/304; C08J 7/042; C09D 125/08;
(Continued)

(56) References Cited

U.S. PATENT DOCUMENTS 3,178,399 A * 4/1965 Lo .......................... C08F 214/22
525/199
4,302,555 A * 11/1981 Falk ........................ C08L 25/06
525/239
(Continued)

FOREIGN PATENT DOCUMENTS

CN    101407617    4/2009
CN    102002203    4/2011
(Continued)

OTHER PUBLICATIONS

Xiaodong Zhao et al., Journal of Physical Chemistry "Tuning the Dielectric Properties of Polystyrene/Poly(vinylidene fluoride) Blends by Selectively Localizing Carbon Black Nanoparticles", Jan. 30, 2013, American Chemical Society, vol. B 2013, pp. 2505-2515.*
(Continued)

*Primary Examiner* — Zachary M Davis
(74) *Attorney, Agent, or Firm* — RatnerPrestia

(57) ABSTRACT

The invention relates to multi-layer thermoplastic composites, and in particular composites having fluoropolymer in the outer layer and a thermoplastic substrate layer. The fluoropolymer outer layer may either be a layer comprising a majority, and preferably 100 percent fluoropolymer, or may be a blend of a thermoplastic matrix with fluoropolymer
(Continued)

at a level of from 5 to 60 weight percent, based on the total weight of all polymers. Especially useful thermoplastic matrices include acrylic polymers, and styrenic polymers, especially styrenic copolymers such as acrylonitrile/styrene/acrylate (ASA), acrylonitrile/butadiene/styrene (ABS) and styrene/acrylonitrile (SAN). While the fluoropolymer may be any fluoropolymer, thermoplastic fluoropolymers, such as polymers and copolymers of polyvinylidene fluoride are especially useful. The improved flame retardant composite of the invention is especially useful in cap layers over plastic substrates, such as for flame-retardant plastic decking, railings, posts, fencing, siding, roofing, and window profiles.

5 Claims, 1 Drawing Sheet

(51) Int. Cl.
| C08J 7/04 | (2020.01) |
|---|---|
| C09D 125/08 | (2006.01) |
| C09D 155/02 | (2006.01) |
| B32B 27/40 | (2006.01) |
| B32B 7/12 | (2006.01) |
| B32B 27/30 | (2006.01) |
| B32B 27/36 | (2006.01) |
| C08J 7/043 | (2020.01) |
| B32B 27/08 | (2006.01) |
| C08L 25/14 | (2006.01) |

(52) U.S. Cl.
CPC .......... *B32B 27/304* (2013.01); *B32B 27/308* (2013.01); *B32B 27/365* (2013.01); *B32B 27/40* (2013.01); *C08J 7/042* (2013.01); *C08J 7/043* (2020.01); *C08L 25/14* (2013.01); *C09D 125/08* (2013.01); *C09D 155/02* (2013.01); B32B 2270/00 (2013.01); B32B 2274/00 (2013.01); B32B 2307/3065 (2013.01); C08J 2300/22 (2013.01); C08J 2425/08 (2013.01); C08J 2425/12 (2013.01); C08J 2427/12 (2013.01); C08J 2427/16 (2013.01)

(58) Field of Classification Search
CPC ........ C09D 155/02; C08F 12/08; C08F 14/18; C08F 14/185; C08F 14/20; C08F 14/22; C08F 14/24; C08F 14/26; C08F 14/28; C08F 112/08; C08F 112/10; C08F 114/18; C08F 114/185; C08F 114/20; C08F 114/22; C08F 114/24; C08F 114/26; C08F 114/28; C08F 212/08; C08F 214/18; C08F 214/182; C08F 214/184; C08F 214/186; C08F 214/188; C08F 214/20; C08F 214/202; C08F 214/205; C08F 214/207; C08F 214/22; C08F 214/222; C08F 214/225; C08F 214/227; C08F 214/24; C08F 214/242; C08F 214/245; C08F 214/247; C08F 214/26; C08F 214/262; C08F 214/265; C08F 214/267; C08F 214/28; C08F 214/282; C08F 214/285; C08F 214/287; C08L 25/04; C08L 25/10; C08L 25/12; C08L 25/14; C08L 25/16; C08L 27/12; C08L 27/14; C08L 27/16; C08L 27/18; C08L 27/20

USPC .......................................................... 428/422
See application file for complete search history.

(56) References Cited

U.S. PATENT DOCUMENTS

| 4,317,860 A * | 3/1982 | Strassel ............... B29C 47/0023 |
| | | 156/244.11 |
| 4,415,519 A | 11/1983 | Strassel |
| 5,242,976 A | 9/1993 | Strassel et al. |
| 5,256,472 A | 10/1993 | Moriya et al. |
| 5,306,548 A * | 4/1994 | Zabrocki ................. B32B 27/08 |
| | | 428/215 |
| 5,322,899 A * | 6/1994 | Grunewalder .......... C08L 27/12 |
| | | 428/422 |
| 6,025,441 A * | 2/2000 | Koshirai ................. C08L 23/12 |
| | | 521/145 |
| 6,321,500 B1 * | 11/2001 | Manning ............. E04F 13/0864 |
| | | 52/309.8 |
| 6,696,513 B1 * | 2/2004 | Welton .................... B32B 27/18 |
| | | 524/405 |
| 6,811,859 B2 | 11/2004 | Bonnet et al. |
| 7,867,604 B2 | 1/2011 | Bonnet et al. |
| 7,901,778 B2 * | 3/2011 | Swei ....................... B32B 27/08 |
| | | 428/212 |
| 7,947,781 B2 | 5/2011 | Arndt et al. |
| 8,129,455 B2 | 3/2012 | Charoensirisomboon et al. |
| 8,516,765 B2 * | 8/2013 | Shaw ........................ B32B 5/18 |
| | | 52/489.1 |
| 2004/0249022 A1 | 12/2004 | Su |
| 2005/0017397 A1 | 1/2005 | Silagy et al. |
| 2008/0032101 A1 | 2/2008 | Reilly |
| 2008/0145652 A1 | 6/2008 | Bonnet et al. |
| 2008/0293837 A1* | 11/2008 | Toft ........................ C08L 33/08 |
| | | 521/54 |
| 2010/0000601 A1 | 1/2010 | Burchill |
| 2010/0175742 A1 | 7/2010 | Burchill et al. |
| 2012/0073632 A1 | 3/2012 | Kosar et al. |
| 2012/0135221 A1 | 5/2012 | Weidinger et al. |
| 2012/0273250 A1* | 11/2012 | Liu ......................... C08L 27/18 |
| | | 174/110 SR |
| 2013/0052440 A1* | 2/2013 | Sakamoto ............... B32B 27/08 |
| | | 428/215 |
| 2013/0122269 A1* | 5/2013 | Bourgeois ............. B32B 27/065 |
| | | 428/215 |
| 2013/0280535 A1* | 10/2013 | Maas ..................... A62C 2/065 |
| | | 428/412 |
| 2014/0147644 A1 | 5/2014 | Crabb et al. |

FOREIGN PATENT DOCUMENTS

| EP | 0476942 A2 | 3/1992 |
| JP | 61106649 | 5/1986 |
| JP | 5279531 | 10/1993 |
| JP | 5279532 | 10/1993 |
| JP | 8157732 | 6/1996 |
| JP | 9124863 | 5/1997 |
| WO | WO2013/033313 | 3/2013 |
| WO | WO2014/152218 | 9/2014 |

OTHER PUBLICATIONS

Zhao, Xiaodong, et al; "Tuning the Dielectric Properties of Polystyrene/Poly(vinylidene fluoride) Blends by Selectively Locating Carbon Black Nanoparticles"; The Journal of Physical Chemistry; pp. 2505-2515; Jan. 30, 2013.

European Communication Pursuant to Article 94(3) for European Application No. 14768306.4, dated Jul. 20, 2021, 3 pages.

* cited by examiner

THERMOPLASTIC COMPOSITE

This application claims benefit, under U.S.C. § 119 or § 365 of PCT Application Number PCT/US2014/027379, filed Mar. 1.4, 2014; and U.S. Provisional Applications No. 61/786,752, filed Mar. 15, 2013 and 61/910,556, filed Nov. 8, 2013; said applications incorporated herein by reference.

FIELD OF THE INVENTION

The invention relates to multi-layer thermoplastic composites, and in particular composite structures having fluoropolymer in the outer layer, and a substrate layer. The fluoropolymer outer layer may either be a layer comprising a majority, and preferably 100 percent fluoropolymer, or may be a blend of a thermoplastic matrix with fluoropolymer at a level of from 5 to 60 weight percent, based on the total weight of all polymers. Especially useful thermoplastic matrices include acrylic polymers, and styrenic polymers, especially styrenic copolymers such as acrylonitrile/styrene/acrylate (ASA), acrylonitrile/butadiene/styrene (ABS) and styrene/acrylonitrile (SAN). While the fluoropolymer may be any fluoropolymer, thermoplastic fluoropolymers, such as polymers and copolymers of polyvinylidene fluoride are especially useful. The use of fluoropolymers in the outer layer of the composite improves flame retardancy The improved composite of the invention is especially useful in cap layers over plastic substrates, such as for flame-retardant plastic decking, railings, posts, fencing, siding, roofing, and window profiles.

BACKGROUND OF THE INVENTION

Many structural plastics exhibit attractive mechanical properties when extruded, molded, or formed into various articles of manufacture. Such articles include, for example, bathtubs, shower stalls, counters, appliance housings and liners, building materials, doors, windows, siding, decking, railings and shutters, lawn and garden applications, marine applications pool application, and storage facilities. Although these structural plastics are strong, tough and relatively inexpensive, the properties of their exposed surfaces are less than ideal. That is, the surfaces of the structural plastics are degraded by light; they can be easily scratched, and can be eroded by common solvents.

Consequently, it has become a practice in the industry to apply another resinous material over the structural plastic to protect the underlying structural material and provide a surface that can withstand abuse associated with the use environment. Such surfacing materials are called "capstocks".

The capstock generally is much thinner than the structural plastic, typically being about 5 to about 25% of the total thickness of the multilayer structure comprising the capstock and structural plastic plies. For example, the thickness of the capstock can be about 0.1 to about 2.5 mm, whereas the thickness of the structural plastic ply can be about 1.0 to about 50 mm.

One issue with most of the capstocks currently used, such as acrylics and styrenics, is that they are relatively flammable. For instance, these capstock materials decrease the flame retardancy of substrates based on polyvinyl chloride (PVC). There is a desire to maintain the weather-resistant properties of the capstock, while improving its flame retardancy. Other issues with current capstocks may include deficiencies in chemical resistance, and resistance to elevated temperature water blushing.

Flame retardant compounds for use in thermoplastics are well known. Most of these involve iodine and/or bromine compounds, such as aliphatic and aromatic bromine compounds, as for styrenic resins as described in US 2012-0184638, or a compound based on phosphorous, or antimony. The problem with these flame retardants is that they tend to have toxicity issues, and with the recommended usage levels of 5-30 weight percent, these flame retardants adversely effect the physical properties (such as tensile strength) of the polymer.

U.S. Pat. No. 8,129,455 describes a flame retardant ASA used at 15-30 wt percent, and made up of 20-80 percent graphite, 20-80 percent of a phosphorous flame retardant, and 0.1 to 2% of a perfluorinated polyolefin.

Fluoropolymers have been added to acrylic polymer matrices to improve weatherability, adhesion to fluoropolymers and impact resistance (U.S. Pat. No. 6,811,859, U52008-0293837, US 2008-0032101, U.S. Pat. No. 7,947, 781).

Surprisingly, it has now been found that the addition of from 5 to 60 wt % of fluoropolymer improves the flame retardancy of a thermoplastic cap layer, without the adverse effects and toxicity of currently used flame retardants. It has also been found that weatherability can be added to a substrate having a styrenic cap layer with a thin outer fluoropolymer layer over the cap layer, without any loss of flame resistance.

SUMMARY OF THE INVENTION

The invention relates to a multi-layer composite structure having a fluoropolymer outer layer over a substrate. The fluoropolymer outer layer may be a thin fluoropolymer-rich layer over a styrenic-rich cap layer, or may be a blend of a styrenic polymer and fluoropolymer containing from 5 to 60 weight percent of a fluoropolymer, the percentage based on the total amount of styrenic polymer and fluoropolymer.

The invention also relates to a multi-layer structure, such as decking, rails, posts, siding, fencing and window profiles, made of the multi-layer flame retardant composite of the invention and achieving a NFPA "A" or "B" rating when tested by ASTM E84 flame test The invention further relates to a process for improving the flame retardancy of a thermoplastic, comprising the step of adding to the thermoplastic composition from 5 to 60 weight percent fluoropolymer, based on the total weight of polymer in the composition, to form a flame-retardant thermoplastic composite. This thermoplastic may then be adhered to a plastic substrate as a cap layer.

BRIEF DESCRIPTION OF THE DRAWINGS

FIG. 1 is a two-layer composite having a blend of a styrenic polymer and 5 to 60 weight percent of a fluoropolymer in a single layer, over a substrate.

FIG. 2 is a composite of two layers: a fluoropolymer-rich layer containing greater than 50% fluoropolymer, and a styrenic-rich layer containing greater than 50% styrenic polymer.

FIG. 3. The composite of claim 1a where the fluoropolymer-rich layer comprises by weight: 51 to 100 parts of fluoropolymer and 49 to 0 parts of acrylic polymer; the total making 100 parts.

FIG. 4 is a composite of claim 1a where the styrenic-rich layer comprises 51 to 100 parts of a styrenic polymer; and 0 to 49 parts of a fluoropolymer.

FIG. 5 is a composite where the styrenic rich layer is optionally blended with 1-60% PVC.

FIG. 6 is a composite where a tie-layer is used between the fluoropolymer-rich layer and the styrenic-rich layer.

FIG. 7 is a composite where the tie-layer is an acrylic-based thermoplastic.

DETAILED DESCRIPTION OF THE INVENTION

Figure 1:
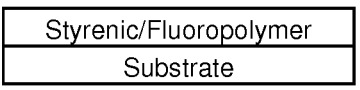
FIGS. 1-7 represent different embodiments of thermoplastic composites of the invention.
Figure 2:
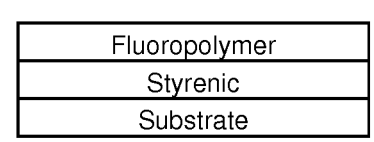
Figure 3:
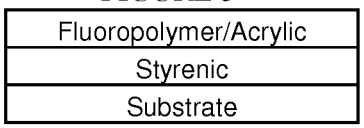
Figure 4:
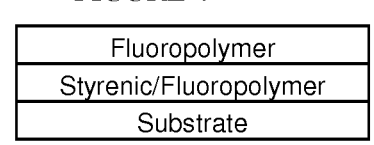
Figure 5:
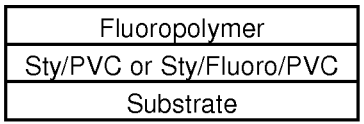
Figure 6:
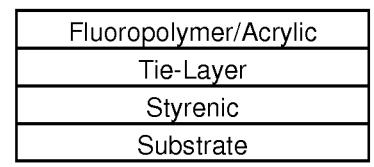
Figure 7:
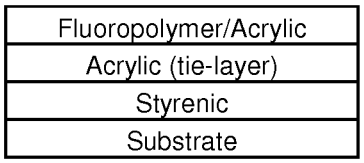

The invention relates to a multi-layer composite structure having a fluoropolymer outer layer over a substrate. The fluoropolymer outer layer may be a thin fluoropolymer-rich layer over a styrenic-rich cap layer, or may be a blend of a styrenic polymer and fluoropolymer containing from 5 to 60 weight percent of a fluoropolymer, the percentage based on the total amount of styrenic polymer and fluoropolymer.

The invention relates to improving the flame retardancy of a thermoplastic cap layer by either the addition of 5 to 60 weight percent of a fluoropolymer, based on the total polymer content, or by placing a fluoropolymer-rich layer over a styrenic layer. The resulting composite can be used as a capstock layer over a substrate.

Unless otherwise indicated, all percentages herein are weight percentages, and all molecular weight are weight average molecular weights measured by gel permeation chromatography (GPC).

Thermoplastic

Thermoplastics useful in the present invention as a cap layer over a substrate, include but not limited to acrylic polymers, styrenic polymers, polyolefins, polyvinyl chloride (PVC), polycarbonate (PC), polyurethane (PU), or mixtures there of.

Styrenic polymers, as used herein, include but are not limited to, polystyrene, high-impact polystyrene (HIPS), acrylonitrile-butadiene-styrene (ABS) copolymers, acrylonitrile-styrene-acrylate (ASA) copolymers, styrene acrylonitrile (SAN) copolymers, methacrylate-acrylonitrile-butadiene-styrene (MABS) copolymers, styrene-butadiene copolymers (SB), styrene-butadiene-styrene block (SBS) copolymers and their partially or fully hydrogenenated derivatives, styrene-isoproene copolymers styrene-isoprene-styrene (SIS) block copolymers and their partially or fully hydrogenenated derivatives, styrene-(meth)acrylate copolymers such as styrene-methyl methacrylate copolymers (S/MMA), and mixtures thereof. A preferred styrenic polymer is ASA. Styrenic copolymers of the invention have a styrene monomer content of at least 10 percent by weight, preferably at least 25 percent by weight.

The styrenic polymers can also be blended with other polymers to form compatible blends. Examples include ASA blended with PVC, and SAN blended with PMMA.

Acrylic polymers, as used herein, include but are not limited to, homopolymers, copolymers and terpolymers comprising alkyl (meth)acrylates.

The alkyl methacrylate monomer is preferably methyl methacrylate, which may make up from 60 to 100 of the monomer mixture. 0 to 40 percent of other acrylate, methacrylate, and/or other vinyl monomers may also be present in the monomer mixture. Other methacrylate, acrylate, and other vinyl monomers useful in the monomer mixture include, but are not limited to methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers, styrene and its derivatives. Alkyl (meth) acrylic acids such as (meth)acrylic acid and acrylic acid can be useful for the monomer mixture. Small levels of multifunctional monomers as crosslinking agents may also be used. A preferred acrylic polymer is a copolymer of methyl methacrylate and 2-16 percent of one or more $C_{1-4}$ acrylates.

The thermoplastic polymers of the invention can be manufactured by any means known in the art, including emulsion polymerization, solution polymerization, and suspension polymerization. In one embodiment, the thermoplastic matrix has a weight average molecular weight of between 50,000 and 500,000 g/mol, and preferably from 75,000 and 150,000 g/mol, as measured by gel permeation chromatography (GPC). The molecular weight distribution of the thermoplastic matrix may be monomodal, or multimodal with a polydispersity index greater than 1.5.

Especially preferred thermoplastics for the matrix polymer are styrenic polymers (including SAN, ABS, MABS, ASA, HIPS) and acrylic polymers.

It is also anticipated that the invention will also work with thermoset plastic matrices, though they are often not as useful as substrates in many applications.

Fluoropolymer

A fluoropolymer is present in the outer layer of the composite of the invention—either as the outer fluoropolymer-rich layer over a styrenic-rich layer, or in a single layer that is a blend of the fluoropolymer with one or more thermoplastic polymers. In the case of a blend, the thermoplastic matrix polymer will have dispersed therein from 5 to 60 weight percent of one or more fluoropolymers, preferably 10 to 40 weight percent, more preferably 15 to 35 weight percent, based on the total polymer (matrix polymer plus fluoropolymer). If the level of fluoropolymer is too low, there is not enough fluorine content to effectively reduce the flame retardancy. Too high level of fluoropolymers can lead to a composite that is too expensive.

The level of compatibility of the fluoropolymer with the matrix thermoplastic polymer is not expected to affect the flame retardancy (provided good mixing achieves a relatively homogeneous composite), though incompatibility can have a negative effect on physical properties, such as impact modification and weatherability.

Useful thermoplastic polymers that can be used in a blend with the Fluoropolymer are styrenics, acrylics, and styrenic-PVC alloys.

Useful fluoropolymers for use in the invention, include, but are not limited to polyvinylidene fluoride (PVDF), ethylene tetrafluoroethylene (ETFE), terpolymers of ethylene with tetrafluoroethylene and hexafluoropropylene (EFEP), terpolymers of tetrafluoroethylene-hexafluoropropylene-vinyl fluoride (THV), polyvinylfluoride (PVF), copolymers of vinyl fluoride, and blends of PVDF with functionalized or unfunctionalized polymethyl methacrylate polymers and copolymers. The fluoropolymers may be functionalized or unfunctionalized, and could be homopolymers or copolymers—preferably copolymers with other fluorine monomers including vinyl fluoride; vinylidene fluoride (VDF); trifluoroethylene (VF3); chlorotrifluoroethylene (CTFE); 1,2-difluoroethylene; tetrafluoro ethylene (TFE); hexafluoropropylene (HFP); perfluoro(alkyl vinyl) ethers, such as perfluoro(methyl vinyl) ether (PMVE), perfluoro (ethyl vinyl) ether (PEVE) and perfluoro(propyl vinyl) ether (PPVE); perfluoro(1,3-dioxole); perfluoro(2,2-dimethyl-1,3-dioxole) (PDD), and blends thereof.

In one embodiment of the invention, the fluoropolymer is a copolymer of vinylidene fluoride and hexafluoropropylene.

In one embodiment of the invention, the blend of matrix polymer and fluoropolymer could be an intimate blend of the two polymers, such as in an acrylic modified fluoropolymer (AMF) in which (meth)acrylate monomers are polymerized in the presence of a fluoropolymer seed. The AMF could be coated or laminated onto a substrate polymer, either at the factory or in the field, to produce a flame-retardant barrier layer.

Other Additives

The fluoropolymer may be, and is preferably used as the sole flame retardant, eliminating the toxicity issues and adverse effect on physical properties from the addition of other, generally used flame retardants. However, small amounts of other flame retardants (above 0.0001 weight percent) may also be blended into the composite. Preferably other flame retardants are used at a level below 20 weight percent, preferably below 10 weight percent, more preferably below 5 weight percent, and even more preferably below 3 weight percent are used, based on the total weight of polymer (matrix polymer and fluoropolymer).

Useful flame retardants include, but are not limited to compounds of tungstate, molybdate, silicate, phosphorous, bromine, and iodine.

The composite of the present invention may also contain, in one or more layers, one or more typical additives for polymer compositions used in usual effective amounts, including but not limited to impact modifiers (both core-shell and linear block copolymers), stabilizers, plasticizers, fillers, coloring agents, pigments, antioxidants, antistatic agents, surfactants, toner, refractive index matching additives, additives with specific light diffraction, light absorbing, or light reflection characteristics, dispersing aids, radiation stabilizers such as poly(ethylene glycol), poly(propylene glycol), butyl lactate, and carboxylic acids such as lactic acid, oxalic acid, and acetic acid, light modification additives, such as polymeric or inorganic spherical particles with a particle size between 0.5 microns and 1,000 microns.

Substrate

The substrate of this invention is a structural plastic based on either thermoplastic or thermoset materials. Thermoplastics useful for the substrate include, but are not limited to, acrylic polymers, polyvinyl chloride (PVC), acrylonitrile-butadiene-styrene (ABS), high impact polystyrene (HIPS), polyolefins (polypropylene, polyethylene, copolymers and mixtures thereof), polycarbonate (PC), polyurethane (PU). A preferred thermoplastic material is PVC. Thermosets useful for the substrate include, but are not limited to, polyesters, epoxy resins, polyurethanes, and polyimides. A preferred thermoset material is polyester.

Polyvinyl chloride (PVC) substrate polymers include polyvinyl chloride, chlorinated PVC, foamed or expanded PVC, filled PVC, including PVC or expanded PVC filled at 0.1 to 80 weight percent with fillers, including but not limited to cellulosic fibers, calcium carbonate, rosin, limestone, aluminum trihydrate, quartz, and silica.

The substrate of the present invention may also contain one or more typical additives for polymer compositions used in usual effective amounts, including but not limited to impact modifiers (both core-shell and linear block copolymers), stabilizers, plasticizers, fillers (e.g. fiber glass, wood fibers), flame retardants, coloring agents, pigments, antioxidants, antistatic agents, surfactants, toner, dispersing aids.

The substrate of the present invention may be foamed.

In one embodiment of the invention, the multilayer composite includes, in order, an outer fluoropolymer-rich layer, a styrenic polymer-rich layer, and a substrate layer.

The fluoropolymer-rich layer contains more than 50 weight percent of fluoropolymer, preferably more than 60 weight percent fluoropolymer, more preferably more than 75 weight percent fluoropolymer, and up to including 100 weight percent of fluoropolymer, based on the weight of polymer in the layer. The fluoropolymer-rich layer may contain from 0 to 49 weight percent, preferably 1 to 35 weight percent, and more preferably 5 to 30 weight percent of one or more acrylic polymers. In a preferred embodiment, the fluoropolymer is a polyvinylidene fluoride homopolymer, or a copolymer of 70-99 weight percent of vinylidene fluoride units and 1 to 30 weight percent of hexafluoropropylene units. The fluoropolymer-rich layer has a thickness of from 0.25 to 5 mil, preferably from 0.3 to 3 mil.

The styrenic-rich polymer layer contains 51 to 100 weight percent of one or more styrenic polymers. In one embodiment, the styrenic-rich layer may contain from 0 to 49 weight percent, preferably 1 to 35 weight percent, and more preferably from 5 to 30 weight percent of one or more fluoropolymers. The styrene-rich layer may also optionally be blended with 1 to 60 weight percent, and preferably 5 to 49 weight percent of PVC polymer. The styrenic-rich layer has a thickness of from 2 to 50 mil, and preferably from 15 to 35 mil.

Optionally, a tie layer may be used between the fluoropolymer-rich layer and the styrenic polymer-rich layer. There is no limit to the type of tie layer used. In one embodiment, the tie layer is an acrylic-based tie layer.

Process

The thermoplastic matrix polymer, fluoropolymer and other additives may be blended in any manner known in the art. In one method, the components are first powder blended, then placed into an extruder where they are melt-blended into a composite and are extruded as a stream and cut into pellets. The pellets are then coextruded over a substrate, (on 1 or more sides) with or without the use of a tie layer. The composite pellets may also be formed into a film or sheet and then laminated or insert-molded over one or more sides of a substrate. The final multi-layer structure, comprising the substrate and flame-retardant layer(s), may be directly extruded in a profile shape (such as for decking, posts, railing, window profiles), or can be extruded in a sheet form and then be thermoformed into a final shape.

In the case of a fluoropolymer rich layer, a styrenic-rich layer and a substrate, any combination of extrusion, coextrusion, lamination and coating may be used. In one embodiment, the styrenic-rich layer is coextruded with the substrate layer, the fluoropolymer layer is separately formed into a thin film, then the fluoropolymer film is laminated or adhered with a tie layer or adhesive layer to the coextruded styrenic layer/substrate. Alternatively, the surface of the Fluoropolymer film that will be in contact with the coextruded styrenic layer/substrate can be surface treated to improve adhesion to the styrenic layer. Any method known in the art to increase the surface energy of this surface can be used including but not limited to corona, plasma, flame, e-beam, sodium etching, or chemical treatment. In another embodiment, the fluoropolymer layer may be applied as a thin coating.

Use

The composites of the invention, when tested in an ASTM E84 flame retardancy test, would be expected to achieve a rating at least one letter grade higher compared to a similar composition without the fluoropolymer. Preferably the substrates with a cap layer of the invention achieve an ASTM E84 rating of at least a Class B, and most preferably a rating of Class A.

The flammability rating of a capstock is related to the thickness of the capstock, with thinner capstocks having better flame retardancy ratings, but the thin capstock also lacks in wear and weatherability protection.

The composites of the invention, when tested by UL-94 flame test would be expected to obtain a UL-94 rating of at least one Class higher (V0, V1, V2) than a multi-layer structure of the same composition but without the fluoropolymer added.

The styrenic/fluoropolymer composite of this invention may also be expected to lead to increased resistance to water blushing. For instance, the styrenic/fluoropolymer composite of the invention would be expected to show less gain in haze (ASTM D1003, ⅛" thick specimens) after soaking in a ~80° C. water bath for 24 hrs as compared to a multi-layer structure of the same composition but without the fluoropolymer added.

The styrenic/fluoropolymer composite of the invention may also be expected to lead to increased weatherability. For instance, the styrenic/fluoropolymer composite of the invention would be expected to show less change in color or gloss after exposure to accelerated or real-time weathering.

The styrenic/fluoropolymer composite of the invention may also be expected to lead to increased chemical resistance when testing with or without stress applied. (ASTM D543/ASTMD1308) The styrenic/fluoropolymer composite of the invention may be expected to have less mass or dimensional changes, greater retention of mechanical properties, and/or show less signs of visible deformation (cracks/crazes, changes in gloss, discoloration, softening, blistering, dissolution) as compared to a multi-layer structure of the same composition but without the fluoropolymer added.

The styrenic/fluoropolymer composite of the invention may also be expected to lead to increased impact resistance when testing by methods such as falling weight (Instrumented Dart Drop—ASTM D3763, Gardner—ASTM D5420) or pendulum type impact tests (Izod—ASTM D256). The styrenic/fluoropolymer composite of the invention may be expected to have greater impact resistance as compared to a multi-layer structure of the same composition but without the fluoropolymer added.

EXAMPLES

Example 1

A flame retardant substrate, PA-765 flame retardant ABS from Chimei, was coextruded with a flammable plastic capstock, Luran SE UV 797 ASA from Styrolution. The coextrusion line was done using a 1.25" Davis Standard main extruder for the substrate and a 1" Davis Standard satellite extruder. The main extruder was set at 350° F. and the cap extruder at 450° F. The polymer melts were combined in a 12" wide dual manifold sheet die set at 350° F. The ABS substrate was about 110 mil in thickness and the ASA capstock was about 15 mil in thickness. The two-layer melt was combined with a multilayer fluoropolymer film, Kynar® 502 CUH HC from Arkema, Inc., and press laminated by passing between two polishing rolls at 195° F. This resulted in the following multilayer structure having good adhesion between each of the layers.

Fluoropolymer[3]
Tie-Layer[3]
Flammable Thermoplastic Capstock[2]
Flame Retardant Substrate[1]

[1]PA-765 flame retardant ABS from Chimei
[2]LURAN SE UV 797 Natural from Styrolution.
[3]Kynar® 502 CUH HC from Arkema, Inc., which is a multi-layer film having a fluoropolymer outer layer and an Adheflon® tie layer.

Example 2

The following samples would be prepared by making a pellet blend and melt compounding the blend on a 27 mm Liestritz twin screw extruder at 230° C.

|  | Example 1 | Comparative Example 2 |
|---|---|---|
| ASA Resin[4] | 80% | 100% |
| Fluoropolymer[5] | 25% |  |

[4]LURAN SE UV 797 Natural from Styrolution.
[5]KYNAR 760 from Arkema, Inc.

Both formulations are then coextruded at a thickness of 12 mil over foamed PVC, 1" thick. The resultant boards are tested for flammability as per ASTM E84 tunnel test. Example 1 would be expected to achieve a NFPA "B" rating in the test, while comparative example 2 a "D" rating.

What is claimed is:

1. A multilayer composite comprising a capstock containing a styrenic polymer, and a fluoropolymer, over a substrate layer, wherein said fluoropolymer is in the outermost layer of the composite wherein said multilayer composite consists of either:
   a) a 2-layer composite having an outer layer comprised of a blend of 5 to 49 weight percent fluoropolymer and 51 to 95 weight percent of styrenic polymer, based on the total weight of the polymer blend, over a substrate; or
   said styrenic polymer(s) being selected from the group consisting of polystyrene, high-impact polystyrene (HIPS), acrylonitrile-butadiene-styrene (ABS) copolymers, acrylonitrile-styrene-acrylate (ASA) copolymers, styrene acrylonitrile (SAN) copolymers, copolymers, styrene-butadiene copolymers (SB), styrene-butadiene-styrene block (SBS) copolymers and their partially or fully hydrogenenated derivatives, styrene-isoprene copolymers styrene-isoprene-styrene (SIS) block copolymers and their partially or fully hydrogenated derivatives, and mixtures thereof, and wherein said substrate is a thermoplastic material selected from the group of polyvinyl chloride (PVC), acrylonitrile-butadiene-styrene (ABS), polyolefins (polypropylene, polyethylene, copolymers and mixtures thereof), polycarbonate (PC), polyurethane (PU), and mixtures thereof,
   wherein said multi-layer structure is flame retardant as determined by one or more tests selected from the group consisting of a) obtaining a NFPA rating of at least one Class higher than a multi-layer structure of the same composition but without the fluoropolymer added, when tested by ASTM E84 flame test, b) obtaining a NFPA "A" or "B" rating when tested by the ASTM E84 flame test, c) obtaining a UL-94 rating of at least one Class higher (V0, V1, V2) than a multi-layer structure of the same composition but without the fluoropolymer added, when tested by UL-94 flame test, and d) obtaining a "V0" rating when tested by the UL-94 flame test.

2. The composite of claim 1, wherein said fluoropolymer is present at from 10 to 40 weight percent and said styrenic polymer is present at from 60 to 90 weight percent.

3. The composite of claim 1 wherein said fluoropolymer is a copolymer of vinylidene fluoride and hexafluoropropene.

4. The multi-layer composite of claim 1, wherein said PVC substrate is filled polyvinyl chloride, or foamed polyvinyl chloride.

5. The multi-layer structure of claim 1, wherein said multi-layer structure is in the form of decking, a railing, a post, fencing, a roofing product, siding, or a window profile.

* * * * *